United States Patent [19]
Smith

[11] Patent Number: 6,069,591
[45] Date of Patent: *May 30, 2000

[54] DIVERSITY ANTENNA SYSTEM

[75] Inventor: Martin Stevens Smith, Essex, United Kingdom

[73] Assignee: Nortel Networks Corporation, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/995,288

[22] Filed: Dec. 19, 1997

[51] Int. Cl.[7] ....................................................... H01Q 9/16
[52] U.S. Cl. ............................ 343/799; 343/815; 343/841
[58] Field of Search ..................... 343/799, 824, 343/825, 829, 702, 834, 810, 794

[56] References Cited

U.S. PATENT DOCUMENTS

| | | |
|---|---|---|
| 5,151,707 | 9/1992 | Kumpfbeck et al. ................... 343/705 |
| 5,329,370 | 7/1994 | Yazolino et al. ........................ 548/734 |
| 5,381,459 | 1/1995 | Lappington ............................... 379/56 |
| 5,532,707 | 7/1996 | Klinger et al. ........................... 343/793 |
| 5,644,622 | 7/1997 | Russell et al. ........................... 455/422 |
| 5,905,467 | 7/1997 | Narayanaswamy et al. ........... 343/702 |

FOREIGN PATENT DOCUMENTS

| | | | |
|---|---|---|---|
| 0 626 736 A1 | 11/1994 | European Pat. Off. ....... | H01Q 21/20 |
| 9001236 | 1/1990 | United Kingdom ........... | H01Q 13/10 |

*Primary Examiner*—Don Wong
*Assistant Examiner*—James Clinger
*Attorney, Agent, or Firm*—Chapman And Cutler

[57] ABSTRACT

Plural antennas are located sufficiently closely to associated radiation reflective surfaces for consequential reduction of elevation beam-width and increase gain in azimuth. Two pairs of antennas associated with differently directed said radiation reflective surfaces afford diversity action. The antennas can be dipoles and the reflective surfaces can be faces of a housing box for related electronics.

26 Claims, 5 Drawing Sheets

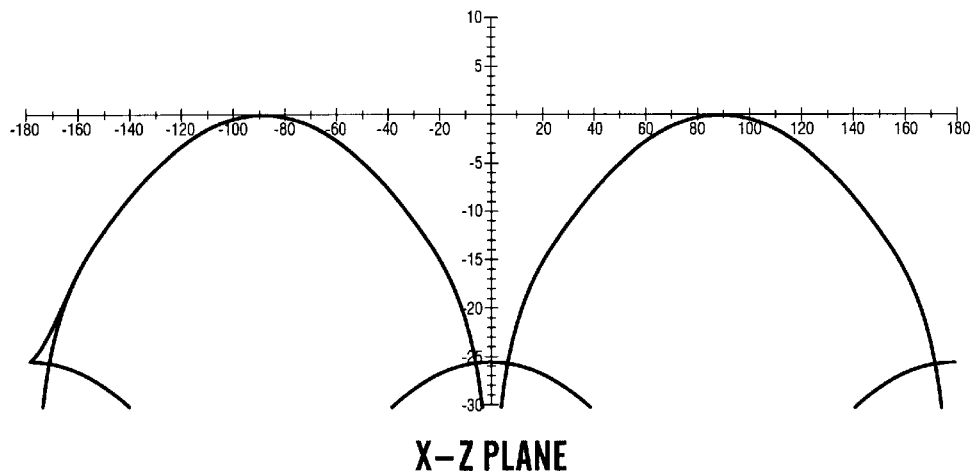
X-Z PLANE
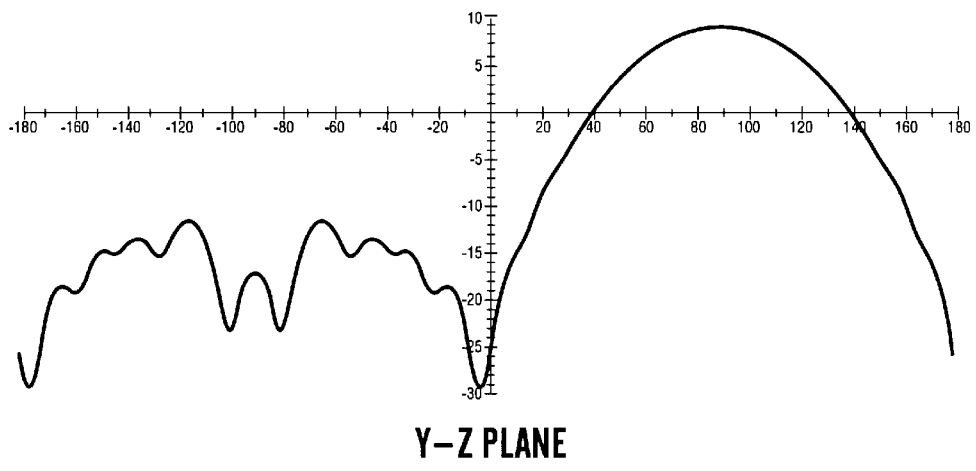
Y-Z PLANE
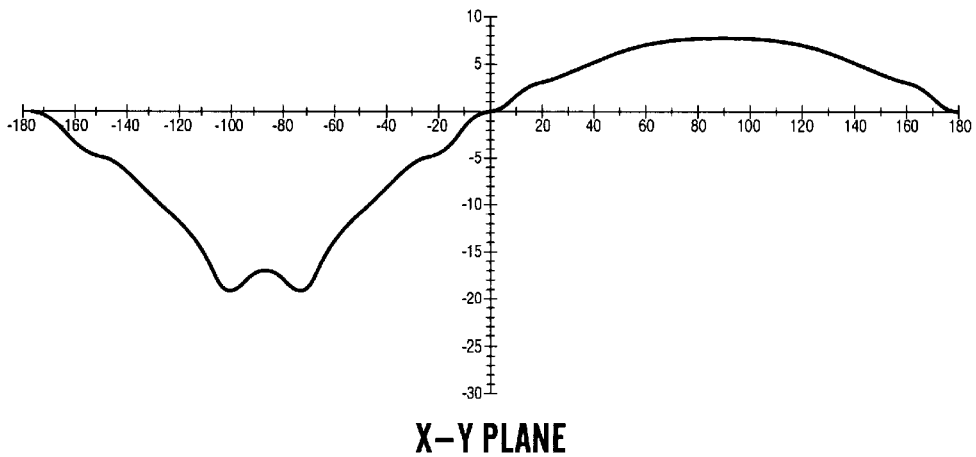
X-Y PLANE
*Fig.3* DIPOLE ON FACE A

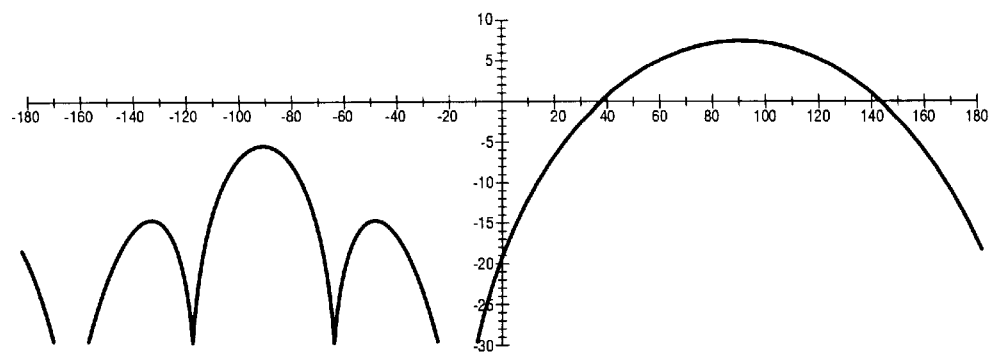
X-Z PLANE
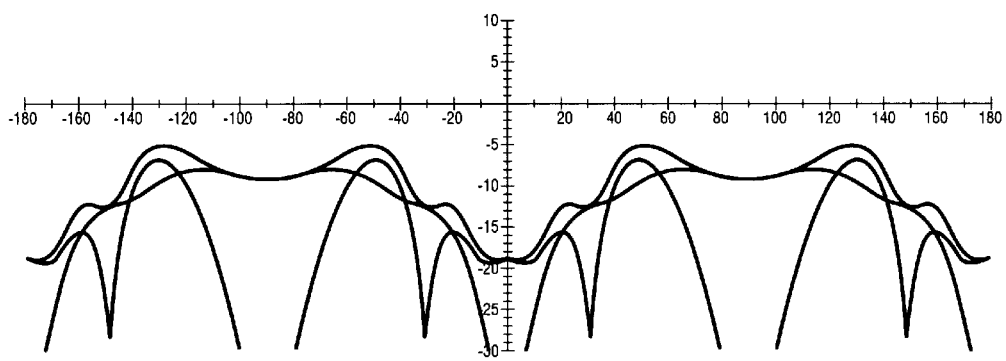
Y-Z PLANE
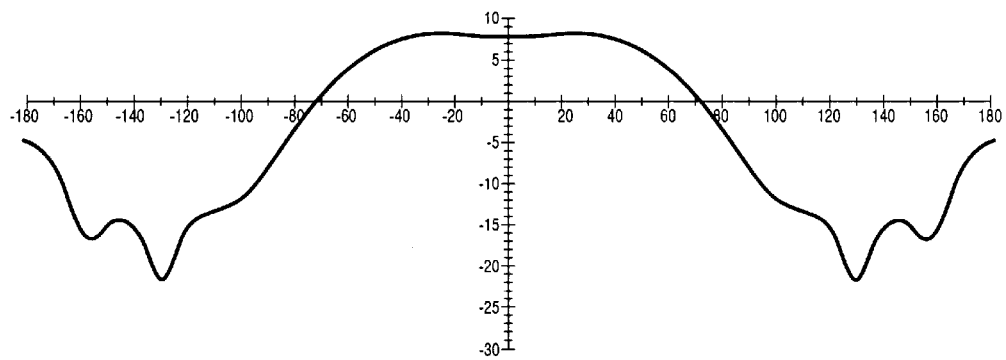
X-Y PLANE
Fig.4 DIPOLE ON FACE B

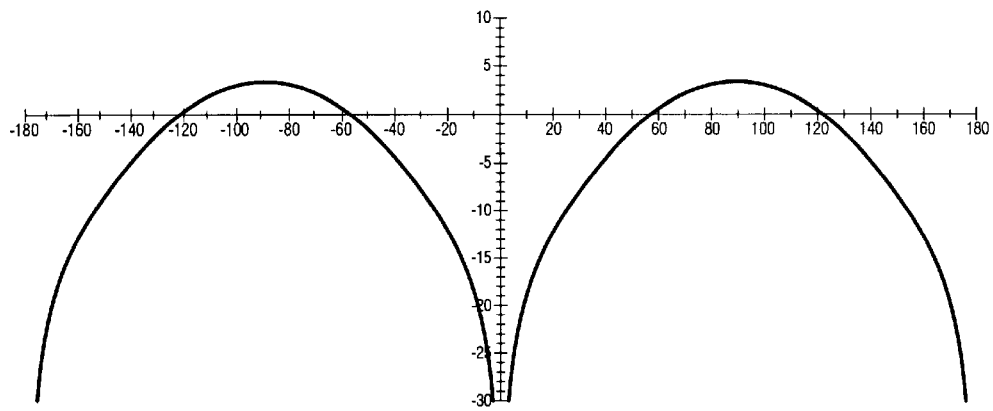
X-Z PLANE
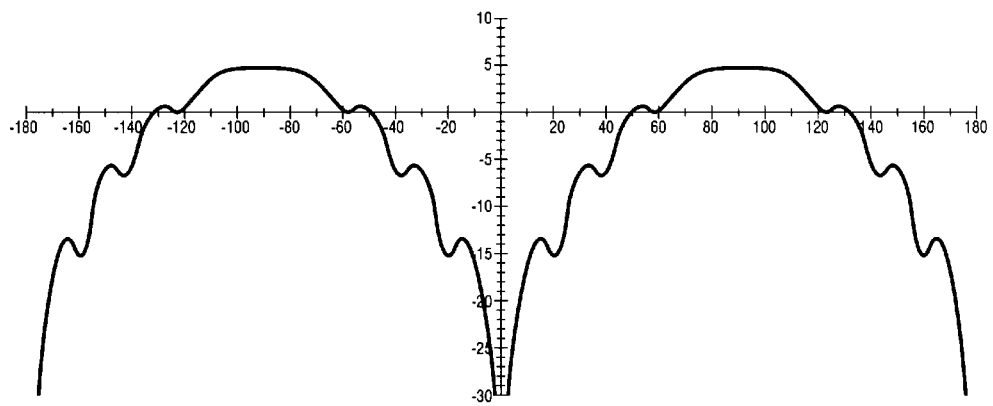
Y-Z PLANE
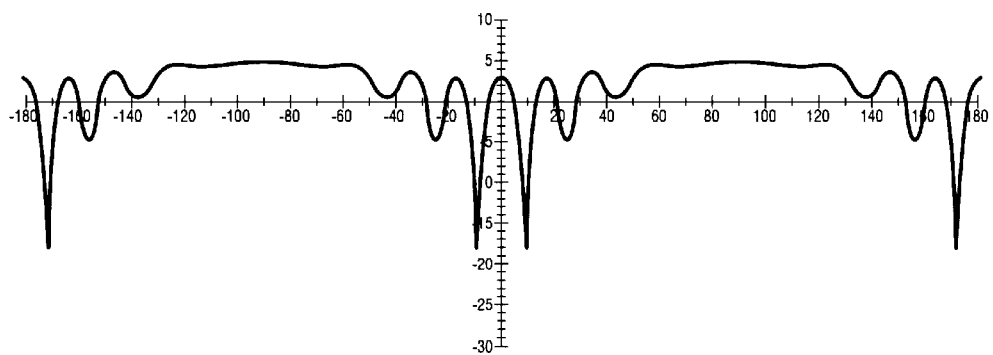
X-Y PLANE
*Fig.5*  DIPOLE ON OPPOSITE FACES A

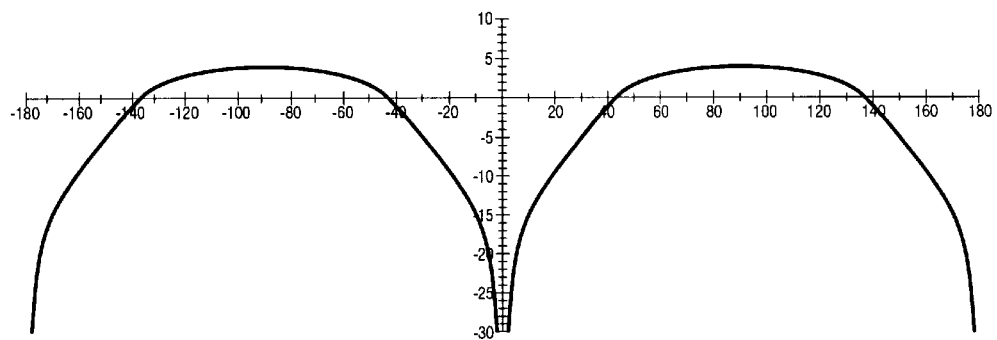
X-Z PLANE
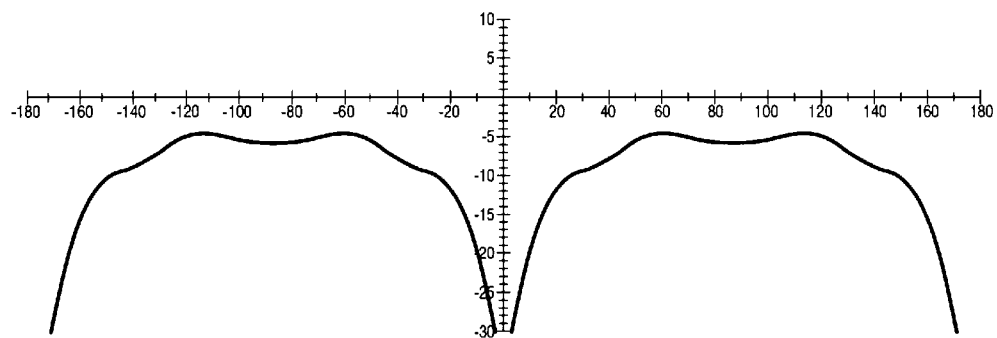
Y-Z PLANE
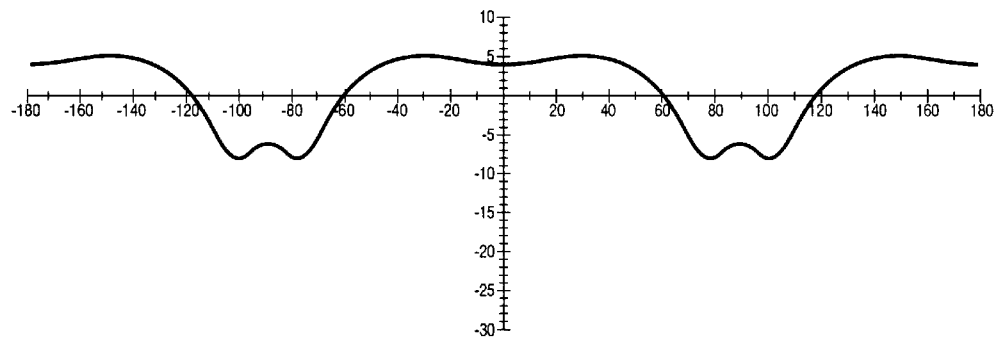
X-Y PLANE
*Fig.6* DIPOLE ON OPPOSITE FACES B

DIVERSITY ANTENNA SYSTEM

FIELD OF INVENTION

This invention relates to radio communication antenna provisions.

BACKGROUND TO INVENTION

Known diversity antenna system with good coverage in the azimuth plane have hitherto usually been of quite costly co-linear type, generally located several wavelengths away from (and consequently with significant length of cable connection to) related electronics housing provision in order to avoid obstruction of radiation in some directions. It is a general object of this invention to facilitate a more compact arrangement, if possible with close coupling of antenna provision and related electronics housing box.

SUMMARY OF INVENTION

According to one aspect of the invention, plural antennas are located sufficiently close to radiation reflective surfaces for consequential reduction of elevation beam-width and increase of gain in azimuth.

Surprisingly good and practically useful results have been obtained using half-wave dipole antennas located in close proximity to generally planar surfaces of a substantially cuboid electronics housing box affording reflection therefrom, specifically at offset spacing therefrom of only a fraction of the wave-length of mid-frequency for radio signals concerned. Successful utility of such reflection is, of course, counter-intuitive in the context of conventional use of sophisticated self-contained co-linear type antennas well spaced from any such box.

Suitable antenna-to-reflective surface offset spacing includes about one-third or less of mid-frequency wavelength, say less than 50 millimeter for about 2 gigahertz mid-frequency wave-length of about 15 centimeters, Specifically successfully modelled at about 25 millimeters offset spacing.

Suitable reflective surfaces normal to azimuth extend beyond antennas to an extent effective for purposes hereof. For convenient substantially centrally mounted half wavelength dipole type antennas intendedly substantially vertical in operation, reflective surface height should be greater than mid-frequency wave-length, preferably to at least one-half such wave-length, and has been successfully modelled at about three times dipole length; and reflective surface width is preferably at least about one-quarter of said midfrequency wave-length beyond each dipole antenna, thus at least half such wave-length in overall width having been successfully modelled from such to over three times midfrequency wave-length, though without upper limit and with possibility of carrying more than one antenna at suitable spacings if great enough.

It has particularly been established that successful diversity action is available using plural dipole antennas in pairs, effectively as equivalent to customary main and diversity antennas provision, respectively. Each pair of antennas can be in respective radiation reflective association with a different pair of opposite surfaces substantially normal to azimuth, with the surfaces of one pair at an angle to the surfaces of the other pair, conveniently orthogonal to give useful 90* rotation of radiation patterns; and with one of each pair of surfaces serving to shield the antenna associated with the other surface of the same pair for particular directions of incident radiation, thus affording spacing of phase centres of the two pairs of antennas as required for space diversity. Moreover, such pairs of antennas further usefully exhibit useful radiation "pattern" diversity, typically by variation of gain for one pair having complementary angular distribution to the other pair, specifically lesser variation where the other has greater variation.

BRIEF DESCRIPTION OF DRAWINGS

Specific practical implementation will now be described and shown with reference to accompanying diagrammatic drawings, in which:

FIGS. 3 and 4 are graphical representations of radiation gain patterns in planes X-Z, Y-Z and X-Y for a single dipole antenna on one only of faces A or B, respectively;

FIGS. 5 and 6 are likewise graphical representations of radiation patterns for pairs of dipole antennas on the opposite pairs of faces A and faces B, respectively.

DESCRIPTION OF EMBODIMENTS

Figure 1:
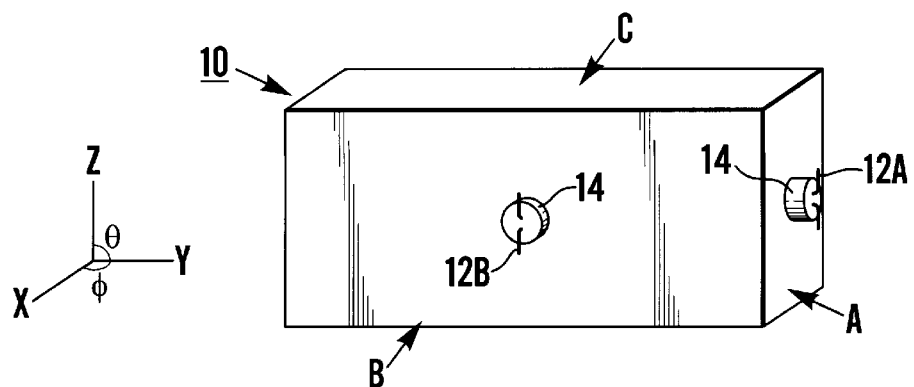
FIG. 1 shows a cuboid box with different sized faces A,B and C, with substantially centre-face location of pairs of dipole antennas at pairs of faces A and B for diversity action; and the X-Y-Z Cartesian co-ordinate system used for FIGS. 3 to 6.

In the drawings, one particular metal cuboid electronics housing box 10 has specific dimensions of about 75×500× 225 millimeter in the indicated X, Y and Z coordinate directions, respectively. Such specific dimensions are not necessarily to be considered to be critical, being given for reference relative to the particular radiation patterns shown in FIGS. 3 to 7 for a mid-band frequency of just under 2 gigahertz. Simple indicated half-wave length dipole antennas 12A, A' and 12B, B' are thus about 75 millimeters long and are indicated located substantially centrally of each of the faces A, B and orientated normal to the X-Y plane, which corresponds to azimuth of desired antennas operation- Other specific antennas could be used, e.g. folded diploes. The dipole antennas 12 are all shown fixedly mounted at short tubular spacers 14, specifically giving about 25 millimeters stand-off or offset spacing, and in preferred orientation perpendicular to the plane X-Y, i.e. nominally vertical in use for horizontal azimuth.

The faces A and B are the smallest and largest, respectively, of the box 10 and the mid-band radiation patterns of FIGS. 3 and 4 having gain as ordinate and angle as abscissa for a single such face and a closely associated dipole antenna 12A or 12B show the effects of radiation reflection by such associated faces. Thus, in FIG. 3, symmetry of the X-Z plane pattern is narrower than would apply to a dipole antenna in free space, and both of the Y-Z and X-Y plane are asymmetric with a peak gain of about 8 dBi, which is much higher than the 2.2 di that would be expected for a dipole in free space. Peak gain in the Y-axis direction is, of course, not important to desired azimuth plane operation. However, the X-Y radiation pattern shows gain above 0 dBi over all of 180°, i.e. affording good half-space Coverage. FIG. 4 also shows reduced beam-width in the X-Z plane, and a peak gain of about 8 dBi in the X-Y plane, i.e. in azimuth. However, the range of X-Y gain greater than 0 dBi is here about 140° and is centred at boresight with a much steeper roll off than for FIG. 3.

Figure 2:
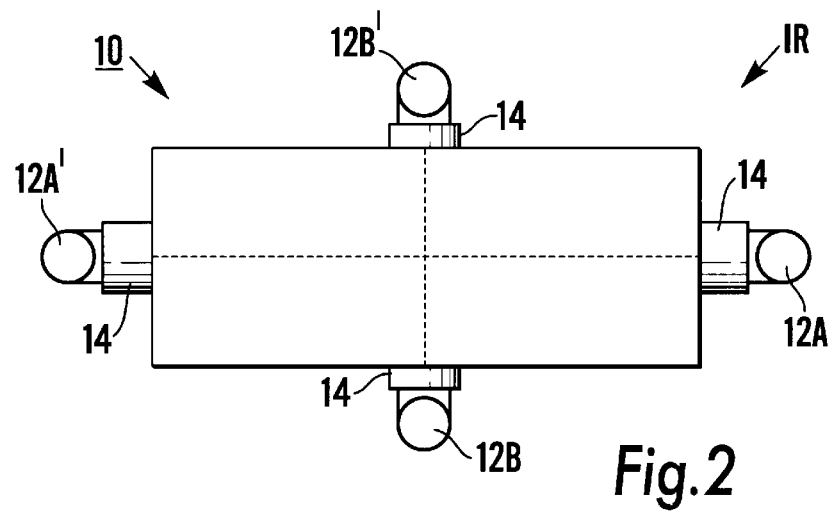
FIGS. 2 is outline X-Y plane/azimuth plan view also showing radiation incident from one direction.

Interestingly, see FIG. 5, the radiation pattern for dipole antennas 12A, A' one on each of the opposite pair of faces A and both fed in-phase again show narrowed X-Z plane radiation pattern and increased X-Y plane gain, but with the latter affording a Substantially medial 90° of steady gain. Peak gain is now around 5 dBi due to power sharing between the two dipole antennas 12A, A'. Substantial endfire coverage is accompanied by useful radiation at and near boresight despite quite deep but narrow nulls over up to about 10°. The nulls are due to dipole antennas separation by the box 10 amounting to several mid-frequency wave-lengths, specifically about 3 wave-lengths. However, radiation pattern coverage is reasonable over 360°, and incident signals, say from a mobile transmitter and see arrow exemplary IR in FIG. 2, would have appreciable angular spread, so that the narrow nulls can be expected to be blurred out. The X-Y plane gain coverage is actually comparable with that of a much more expensive co-linear type antenna element.

Turning to FIG. 6, radiation patterns for dipole antennas on each of the opposite faces B and also fed in-phase again show reduced X-Z plane beam-width and peak X-Y plane gain of about 4–5 dBi resulting from power sharing The effect of closer spacing of the dipole antennas at about half mid-frequency wave-length is evidenced by absence of deep narrow nulls both near boresight and for endfire. There is fairly good coverage in the X-Y plane and absence of nulls around φ=0 indicates that the dipole antennas could be fixed yet closer to the faces B.

Figure 7:
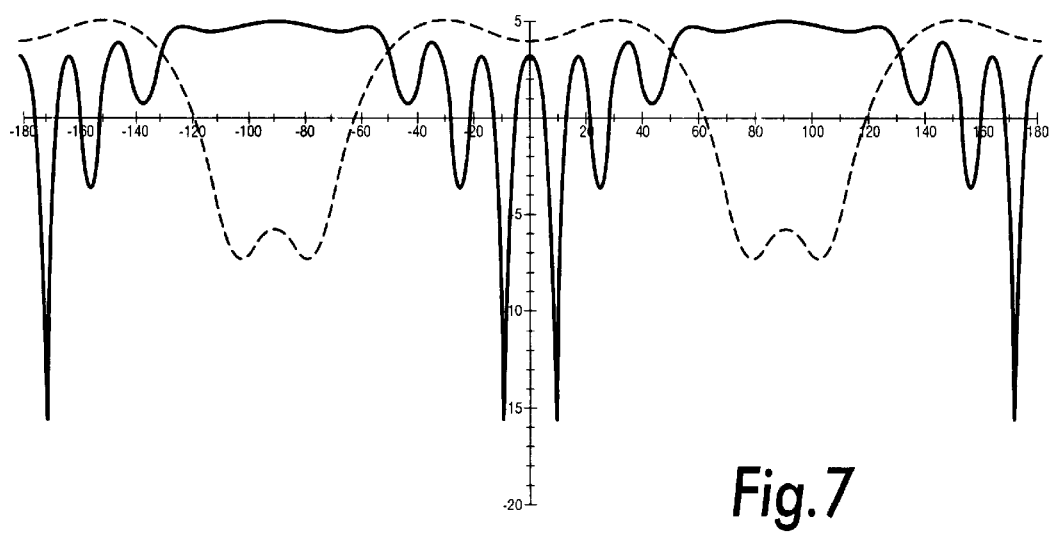
FIG. 7 shows superposition of the X-Y radiation patterns of FIGS. 5 and 6 as practical for diversity action by box-face associated antennas hereof.

Nulls and extended gain peaks of radiation patterns of FIGS. 5 and 6 are substantially complementary, see their superposition in FIG. 7 for diversity antennas action. Regarding such action, space diversity is assured by physical separation of phase centres of the two antennas pairs 12A, A' and 12B, B' as apparent from FIG. 2 and indicated incident radiation IR, e.g. antennas 12A and 12B' affording a degree of effective shielding to other antennas 12A' and 12B. respectively of each pair, thus shifting phase centres for those pairs differently away from the centre point CP of the box 10. There is, of course, also some radiation pattern diversity as evident from gain for the antennas pair 12B, B' being substantially constant near 0° where gain for the antennas pair 12A, A' is quite rapidly varying, so that the various angular components causing Rayleigh fading will be summed differently and allow good diversity performance to be maintained with modest angular spread.

What is claimed is:

1. A method of radio communication in a predetermined frequency range having a predetermined mid-frequency, comprising the steps:
   providing a first pair of oppositely directed radiation reflective surfaces normal to the azimuth plane,
   providing a second pair of oppositely directed radiation reflective surfaces normal to the azimuth plane, directed in different directions to the first pair of radiation reflective surfaces,
   providing an antenna spaced away from each of the radiation reflective surfaces of the first pair and the second pair by a distance of less than one third of wavelength of electromagnetic radiation at said predetermined mid-frequency for producing a signal of reduced elevation beam width and increased gain of radiation emitted into the azimuth plane, and
   feeding the first pair of antennas in combination and the second pair of antennas in combination to produce two radio signals with diversity action.

2. Method according to claim 1, wherein the antennas are each spaced from associated one of said radiation reflective surfaces by less than one-quarter of wave-length of mid-frequency for intended operation.

3. Method according to claim 1, wherein the antennas are each spaced from associated one of said radiation reflective surfaces by between 25 millimeters and 50 millimeters.

4. Method according to claim 1, wherein a pair of said oppositely directed radiation reflective surfaces are spaced by about half wave-length of mid-frequency for intended operation.

5. Method according to claim 1, wherein a pair of said oppositely directed radiation reflective surfaces are spaced by several wave-lengths of mid-frequency for intended operation.

6. Method according to claim 1, wherein the oppositely directed radiation reflective surfaces associated with each of the pairs of antennas are differently spaced.

7. Method according to claim 6, wherein the oppositely directed radiation reflective surfaces associated with one of the pairs of antennas are spaced to give an azimuth radiation pattern with substantially steady gain about bore sight and the oppositely directed radiation reflective surfaces of the other pair of antennas are less spaced to give substantially steady gain to each side of that for the one pair.

8. Method according to claim 7, wherein the radiation reflective surfaces associated with one of the pairs of antennas are oppositely directed substantially orthogonally to also oppositely directed said radiation reflective surfaces of the other of the pairs of antennas.

9. Method according to claim 8, wherein the radiation reflective surfaces are faces of a generally cuboid box.

10. Method according to claim 9, wherein the box houses electronic circuitry associated with operation of said antennas.

11. Method according to claim 1, wherein the antennas are dipoles and each of said associated radiation reflective surfaces is placed to extend beyond the dipole concerned.

12. Method according to claim 11, wherein the associated radiation reflective surfaces extend beyond ends of the dipoles concerned by one half wave-length of mid-frequency of intended operation.

13. Method according to claim 11, wherein the associated radiation reflective surfaces extend to each side of the dipoles concerned by one quarter wave-length of mid-frequency of intended operation.

14. A radio antenna apparatus for operating in a predetermined frequency range having a predetermined mid-frequency, comprising
   a first pair of oppositely directed radiation reflective surfaces normal to the azimuth plane,
   a second pair of oppositely directed radiation reflective surfaces normal to the azimuth plane, the second pair of radiation reflective surfaces being directed in different directions to the first pair of radiation reflective surfaces, and
   first pair of antennas and second pair of antennas, the antennas spaced away from each of the radiation reflective surfaces of the first pair of radiation reflective surfaces and the second pair of radiation reflective surfaces by a distance of less than one third of wave-length of electromagnetic radiation at the predetermined mid-frequency, for reducing elevation beam width and increasing gain of radiation emitted into the azimuth plane; wherein
   the antennas of the first pair are fed in combination with one another, the antennas of the second pair are fed in combination with one another, and the antenna apparatus has diversity action.

15. Apparatus according to claim 14, wherein the antennas are each spaced from associated one of said radiation reflective surfaces by less than one-quarter of wave-length of mid-frequency for intended operation.

16. Apparatus according to claim 14, wherein the antennas are each spaced from associated one of said radiation reflective surfaces by between 25 millimeters and 50 millimeters.

17. Apparatus according to claim 14, wherein a pair of said oppositely directed radiation reflective surfaces is spaced by about half wave-length of mid-frequency for intended operation.

18. Apparatus according to claim 14, wherein a pair of said oppositely directed said radiation reflective surfaces is spaced by several wave-lengths of mid-frequency for intended operation.

19. Apparatus according to claim 14, wherein the oppositely directed radiation reflective surfaces associated with each of the pairs of antennas are differently spaced.

20. Apparatus according to claim 19, wherein the oppositely directed radiation reflective surfaces associated with one of the pairs of antennas are spaced to give an azimuth radiation pattern with substantially steady gain about boresight and the oppositely directed radiation reflective surfaces of the other pair of antennas are less spaced to give substantially steady gain to each side of that for the one pair.

21. Apparatus according to claim 20, wherein the radiation reflective surfaces associated with one of the pairs of antennas are oppositely directed substantially orthogonally to also oppositely directed said radiation reflective surfaces of the other of the pairs of antennas.

22. Apparatus according to claim 21, wherein the radiation reflective surfaces are faces of a generally cuboid box.

23. Apparatus according to claim 22, wherein the box houses electronic circuitry associated with operation of said antennas.

24. Apparatus according to claim 14, wherein the antennas are dipoles and each of said associated radiation reflective surfaces extends beyond the dipole concerned.

25. Apparatus according to claim 24, wherein the associated radiation reflective surfaces extend beyond ends of the dipoles concerned by one half wave-length of mid-frequency of intended operation.

26. Apparatus according to claim 24, wherein the associated radiation reflective surfaces extend to each side of the dipoles concerned by one quarter wave-length of mid-frequency of intended operation.

* * * * *